United States Patent
Guillouard et al.

(10) Patent No.: US 9,173,182 B2
(45) Date of Patent: Oct. 27, 2015

(54) TRANSMISSION METHOD IN A WIRELESS NETWORK AND CORRESPONDING RECEPTION METHOD

(75) Inventors: Samuel Guillouard, Sesson Sevigne Cedex (FR); Patrick Fontaine, Cesson Sevigne Cedex (FR); Charline Guguen, Cesson Sevigne Cedex (FR)

(73) Assignee: Thomson Licensing, Issy-les-Moulineaux (FR)

( * ) Notice: Subject to any disclaimer, the term of this patent is extended or adjusted under 35 U.S.C. 154(b) by 342 days.

(21) Appl. No.: 13/138,320

(22) PCT Filed: Feb. 1, 2010

(86) PCT No.: PCT/EP2010/051186
§ 371 (c)(1),
(2), (4) Date: Dec. 7, 2011

(87) PCT Pub. No.: WO2010/089277
PCT Pub. Date: Aug. 12, 2010

(65) Prior Publication Data
US 2012/0071181 A1 Mar. 22, 2012

(30) Foreign Application Priority Data
Feb. 6, 2009 (FR) ..................................... 09 50741

(51) Int. Cl.
*H04B 1/00* (2006.01)
*H04B 7/00* (2006.01)
*H04W 36/00* (2009.01)
*H04W 40/00* (2009.01)
(Continued)

(52) U.S. Cl.
CPC .......... *H04W 56/0045* (2013.01); *H04W 92/10* (2013.01)

(58) Field of Classification Search
CPC ..................... H04W 56/001; H04W 56/0065
USPC .................. 455/500, 502, 67.13, 63.1, 522
See application file for complete search history.

(56) References Cited

U.S. PATENT DOCUMENTS 6,505,037 B1 * 1/2003 Kandala ..................... 455/277.2
6,766,146 B1 * 7/2004 Park et al. ..................... 455/69
(Continued)

FOREIGN PATENT DOCUMENTS

EP 1926251 A1 5/2008
FR 2864414 6/2005
(Continued)

OTHER PUBLICATIONS

Search Rept: May 17, 2010.
(Continued)

*Primary Examiner* — Tilahun B Gesesse
(74) *Attorney, Agent, or Firm* — Myers Wolin LLC

(57) ABSTRACT

The invention relates to a method for transmission in a wireless network comprising a plurality of base stations and at least one mobile terminal, a mobile terminal (MT) transmitting a same signal (704) intended for the plurality of base stations (BS1,BS2, BS3). In order to optimise the synchronisation of the mobile terminal with the plurality of base stations, the method comprises a step of transmission of an item of information representative of a first temporal offset intended for the mobile terminal, the first offset being according to at least one reception time (740, 750, 760) of the first signal by at least one base station (BS1,BS2,BS3).

11 Claims, 8 Drawing Sheets

Figure 1:
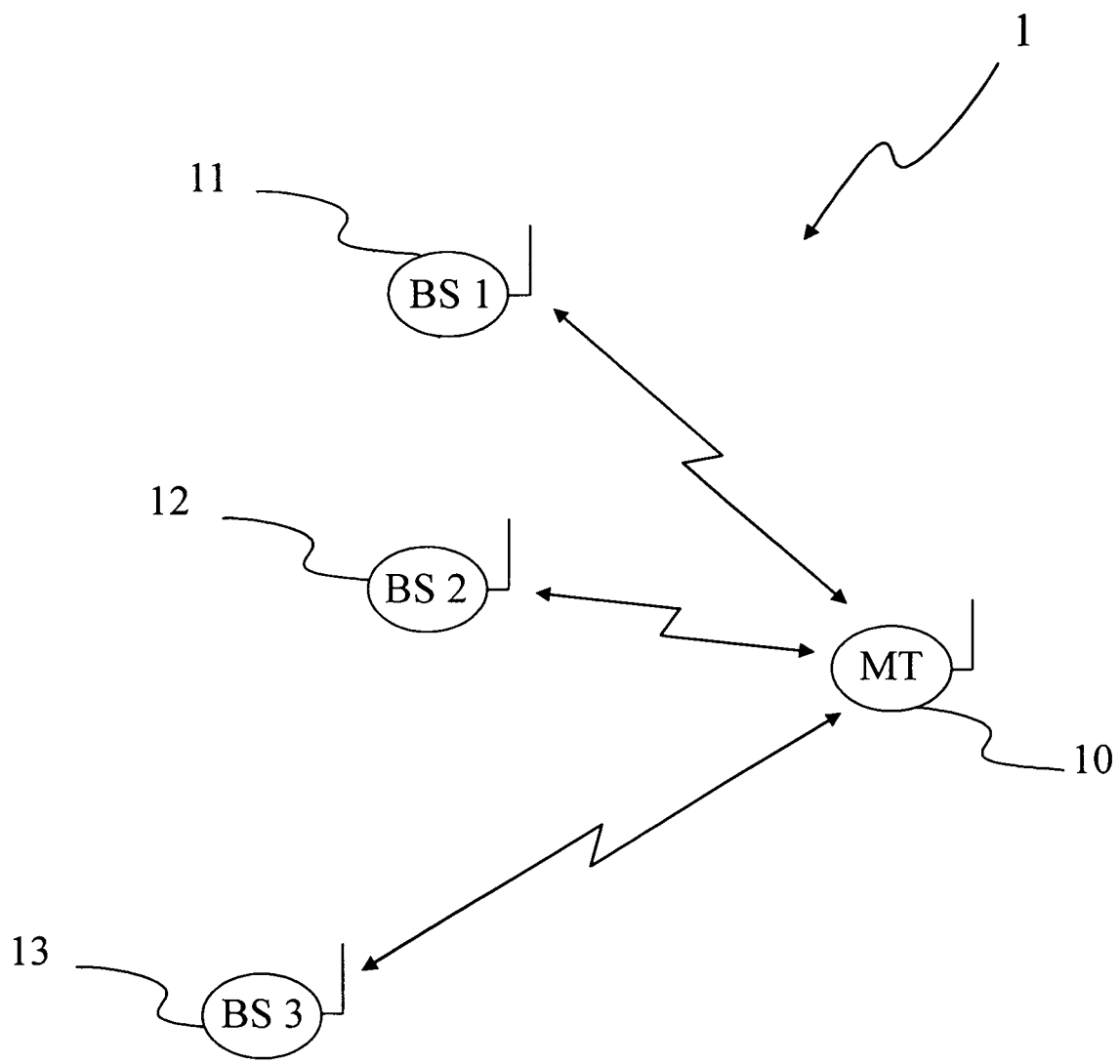

(51) Int. Cl.
*H04W 56/00* (2009.01)
*H04W 92/10* (2009.01)

(56) References Cited

U.S. PATENT DOCUMENTS

| | | | |
|---|---|---|---|
| 6,768,903 B2 * | 7/2004 | Fauconnier et al. | 455/403 |
| 6,904,290 B1 * | 6/2005 | Palenius | 455/522 |
| 7,194,054 B2 * | 3/2007 | Sanchez | 375/356 |
| 7,254,118 B1 * | 8/2007 | Terasawa et al. | 370/328 |
| 7,532,891 B2 | 5/2009 | Febvre et al. | |
| 2002/0122461 A1 | 9/2002 | Hervey, Jr. et al. | |
| 2003/0096624 A1 * | 5/2003 | Ormson | 455/456 |
| 2004/0120354 A1 * | 6/2004 | Benveniste | 370/503 |
| 2006/0153147 A1 | 7/2006 | Chillariga et al. | |
| 2008/0045224 A1 | 2/2008 | Lu et al. | |
| 2009/0104917 A1 | 4/2009 | Ben Rached et al. | |

FOREIGN PATENT DOCUMENTS

| | | |
|---|---|---|
| GB | 2418568 A | 3/2006 |
| IT | TO20001097 A1 | 6/2013 |
| JP | 09275382 A | 10/1997 |
| JP | 2000269876 A | 9/2000 |
| JP | 2001524268 A | 11/2001 |
| JP | 2006506917 A | 2/2006 |
| KR | 100814762 B1 | 3/2008 |
| WO | 9639749 A1 | 12/1996 |
| WO | 0243428 A1 | 5/2002 |
| WO | 2004046893 A2 | 6/2004 |
| WO | 2008056864 A1 | 5/2008 |

OTHER PUBLICATIONS

IIEEE Std 802.16e 2005 and IEEE Std 802.16 2004/Cor1-2005, IEEE Standard for Local and metropolitan area networks, Part 16: Air Interface for Fixed and Mobile Broadband Wireless Access Systems; Amendment 2: Physical and Medium Access Control Layers for Combined Fixed and Mobile Operation in Licensed Bands and Corrigendum 1, IEEE Computer Society and the IEEE Microwave Theory and Techniques Society, Feb. 28, 2006.

* cited by examiner

TRANSMISSION METHOD IN A WIRELESS NETWORK AND CORRESPONDING RECEPTION METHOD

This application claims the benefit, under 35 U.S.C. §365 of International Application PCT/EP2010/051186, filed Feb. 1, 2010, which was published in accordance with PCT Article 21(2) on Aug. 12, 2010 in French and which claims the benefit of French patent application No. 0950741 filed Feb. 6, 2009.

DOMAIN OF THE INVENTION

The invention relates to the domain of telecommunications and more specifically to the transmission and reception of wireless signals in a system comprising several base stations broadcasting data synchronously and at a same frequency and at least one mobile terminal, each mobile terminal transmitting the same signals intended for base stations.

PRIOR ART

According to the prior art, some cellular networks for example of GSM (Global System for Mobile communication) type or of PDC (Personal Digital Cellular) type use a channel access method of TDMA (Time Division Multiple Access) type thus enabling several users to share a same frequency channel in a cell by dividing the signal into different time slots. However, each cell being surrounded by six neighbouring cells, interference problems appear at the overlapping areas between several cells. To overcome this problem of interferences, one solution consists in associating a different frequency with each of the adjacent cells in order to avoid any overlapping of frequencies. When a mobile terminal progresses from one cell to another, the network must then put in place a process called "handover" to avoid any interruption of service at the level of the mobile terminal during its passage from one cell to another. During this "handover", a new physical channel is assigned to the mobile terminal by the network, each mobile terminal communicating with a single base station at a time via a specific physical channel (characterized for example by a frequency channel).

Moreover, a cell of a cellular network can attain a radius of a few dozen kilometres, for example 35 km in the GSM system. Two mobile stations associated with the base station covering the cell may thus each be subjected to different and non-negligible propagation delays. In the TDMA context, there is a risk that two mobile terminals using two consecutive intervals send bursts that overlap at the base station level. A solution consists in synchronizing the transmission of bursts per each mobile terminal with the associated base station to avoid the collision of bursts transmitted at the level of the base station. This synchronisation is carried out via the transmission of TA (Timing Advance) commands, by the base station associated with the mobile terminals, which instruct each mobile terminal so that it transmits in advance of a period for which the value is determined by the network. Each mobile terminal being associated with a unique base station, this synchronisation operation is to be repeated at any change of cell and thus of any change of associated base station.

SUMMARY OF THE INVENTION

The purpose of the invention is to overcome at least one of these disadvantages of the prior art.

More specifically, the purpose of the invention is notably to optimise the temporal synchronisation of one (or several) mobile terminal(s) with several base stations in a wireless network.

The invention relates to a method for transmission in a wireless network, the network comprising a plurality of base stations and at least one mobile terminal, at least one same first signal being transmitted by a mobile terminal intended for a plurality of base stations. The method comprises a step of transmission of an item of information representative of a first temporal offset intended for the mobile terminal, the first offset being according to at least one reception time of the at least one same first signal by at least one base station.

According to a particular characteristic, the first offset is according to at least two reception times of the at least one first signal by at least two base stations.

Advantageously, the first offset is according to the difference between the at least one reception time of the at least one first signal by the at least one base station and a reference time, the first offset being to apply to a transmission of at least one same second signal by the mobile terminal intended for the plurality of base stations.

According to another characteristic, the first offset is according to a first parameter belonging to the group comprising:
  a power of a signal received by at least on base station of said plurality,
  a connection quality between the at least one base station of said plurality and the mobile terminal, and
  an available bitrate of the at least one base station of said plurality.

Advantageously, the method comprises a step of election of at least one reference base station for the mobile terminal among the plurality of base stations according to at least one determined criterion belong to the group comprising:
  a temporal offset,
  a power of a signal received by at least on base station of said plurality,
  a connection quality between the at least one base station of said plurality and the mobile terminal, and
  an available bitrate of the at least one base station of said plurality.

According to another characteristic, the method comprises a step of estimation of at least a second temporal offset for the reception of the at least one second signal by the at least one base station.

According to a specific characteristic, the method comprises a step of reception, by at least one base station, of at least one item of information representative of the second temporal offset for the reception of the at least one second signal by the at least one base station.

Advantageously, the method comprises a step of reception, by at least one base station, of at least one item of information representative of an interval of silence, the interval of silence being a function of the at least one second temporal offset.

According to a particular characteristic, the interval of silence is according to the maximum of at least two second temporal offsets each associated with a base station.

According to another characteristic, the steps of the method are reiterated according to at least a second parameter.

The invention also relates to a method for reception of a signal in a wireless network, the network comprising a plurality of base stations and at least one mobile terminal, at least one same first signal being transmitted by a mobile terminal intended for a plurality of base stations. The method for reception comprises a step of reception, via the mobile terminal, of an item of information representative of a first temporal offset, the first offset being according to at least one reception time of the at least one first signal by at least one base station.

According to a particular characteristic, the first offset is according to at least two reception times of the at least one first signal by at least two base stations.

Advantageously, the first offset is according to the difference between the at least one reception time of the at least one first signal by the at least one base station and a reference time, the first offset being to apply to the transmission of at least one same second signal by the mobile terminal intended for the plurality of base stations.

LIST OF FIGURES

Figure 2:
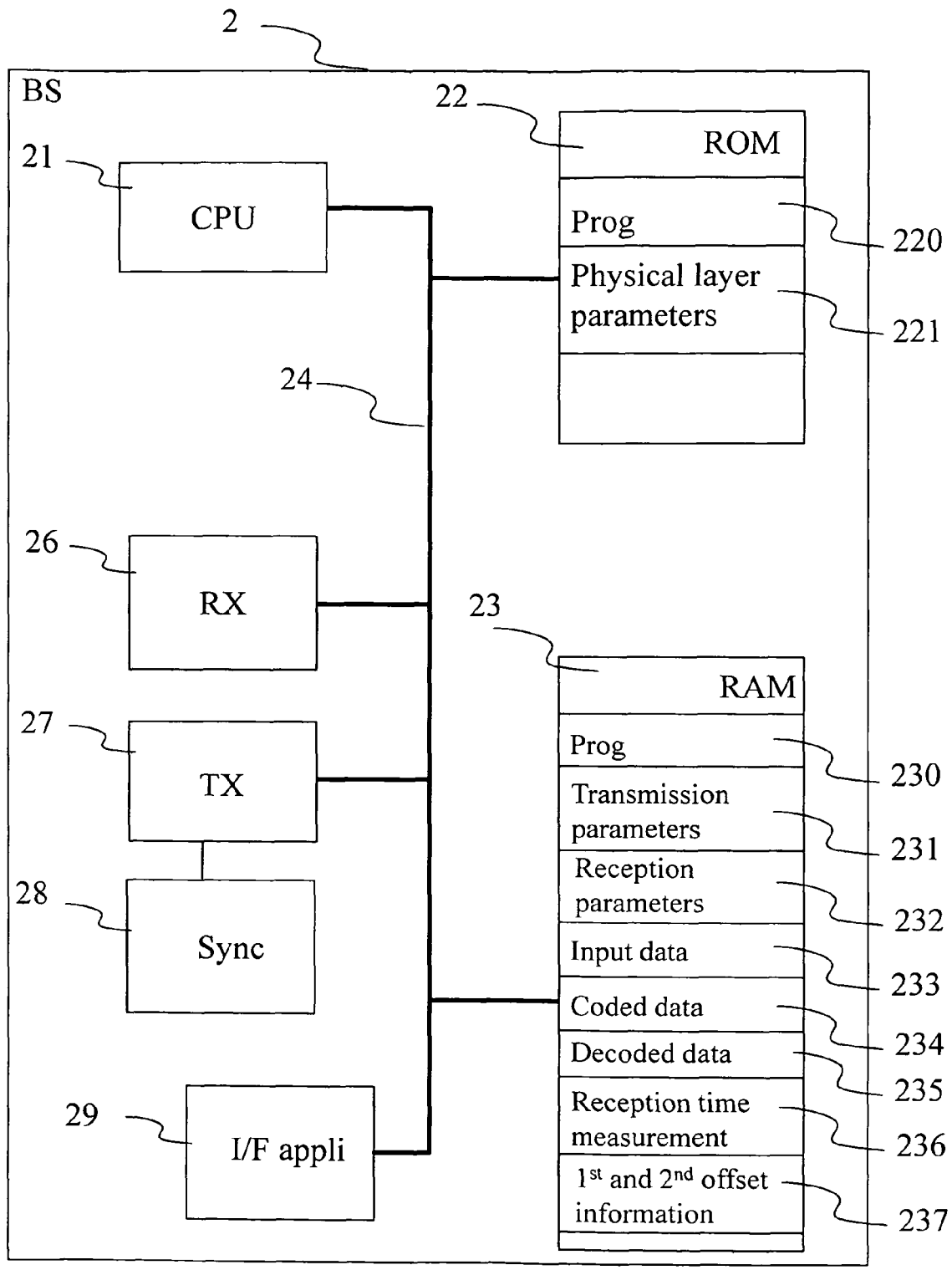
Figure 3:
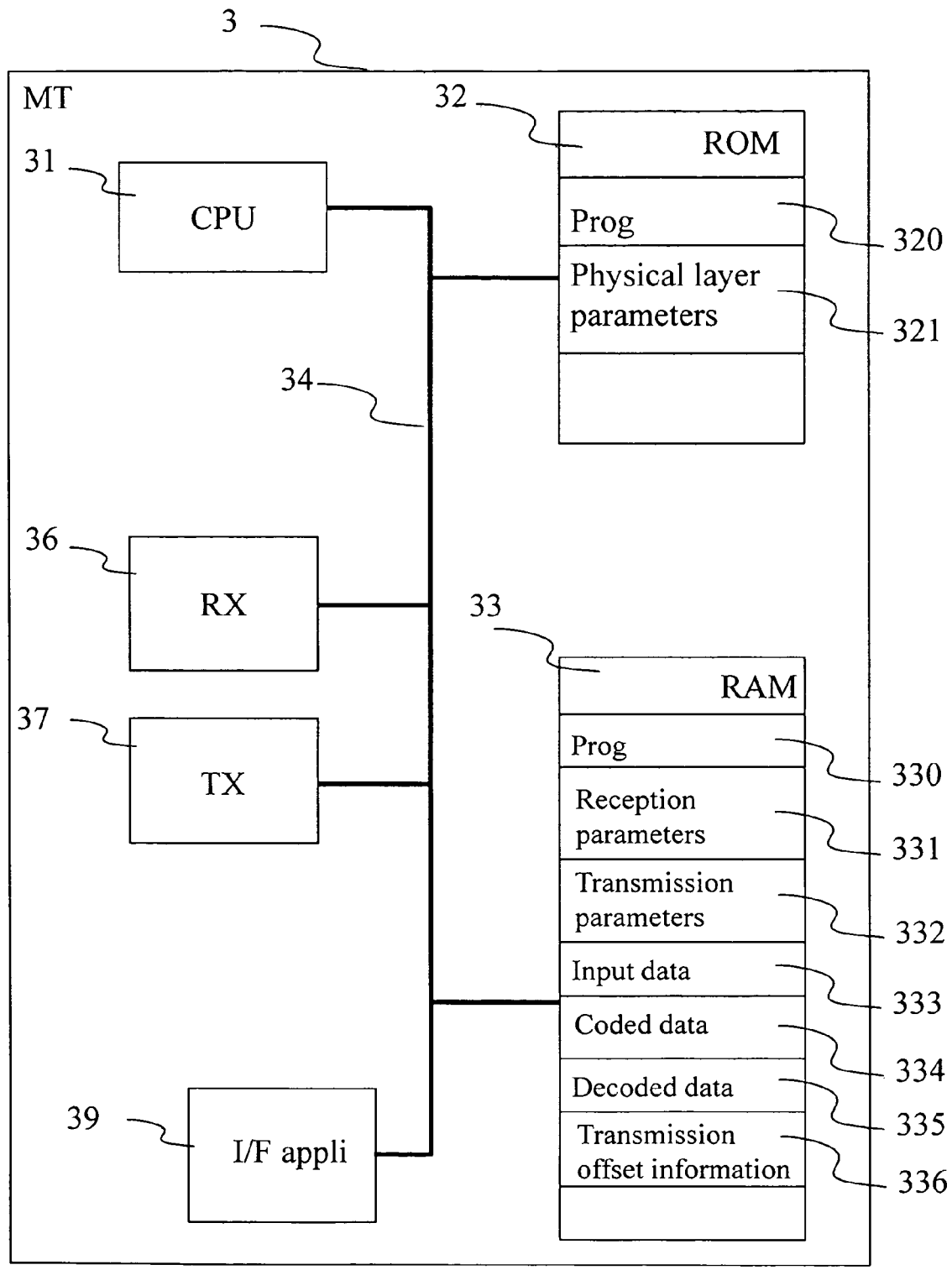
Figure 4:
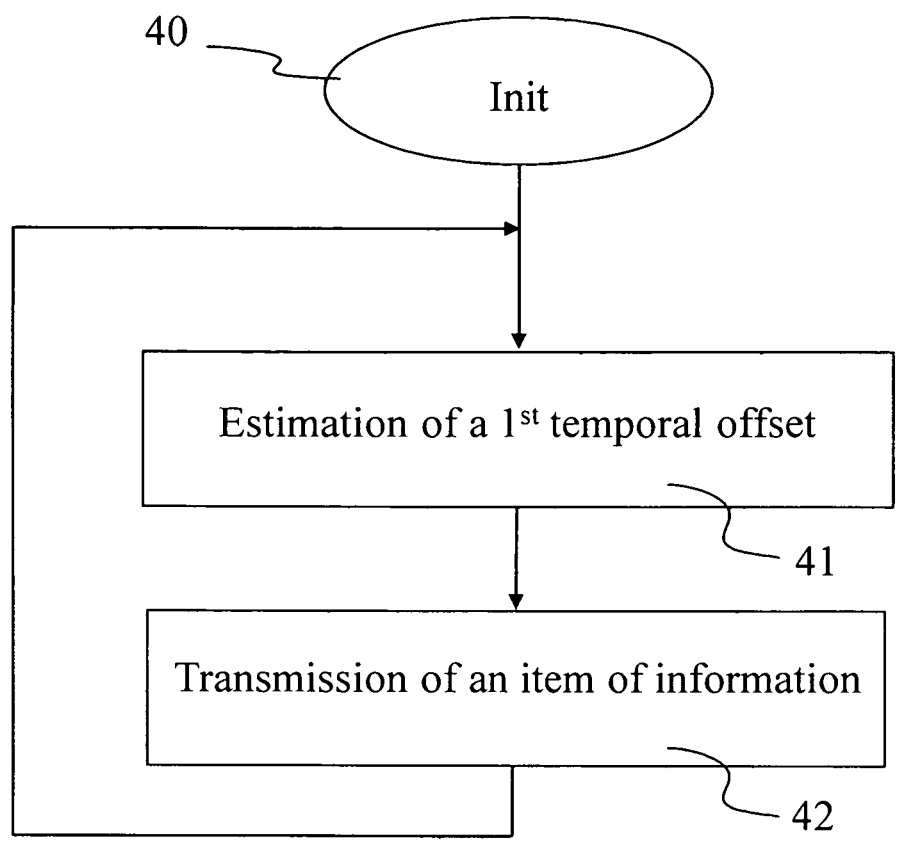
Figure 5:
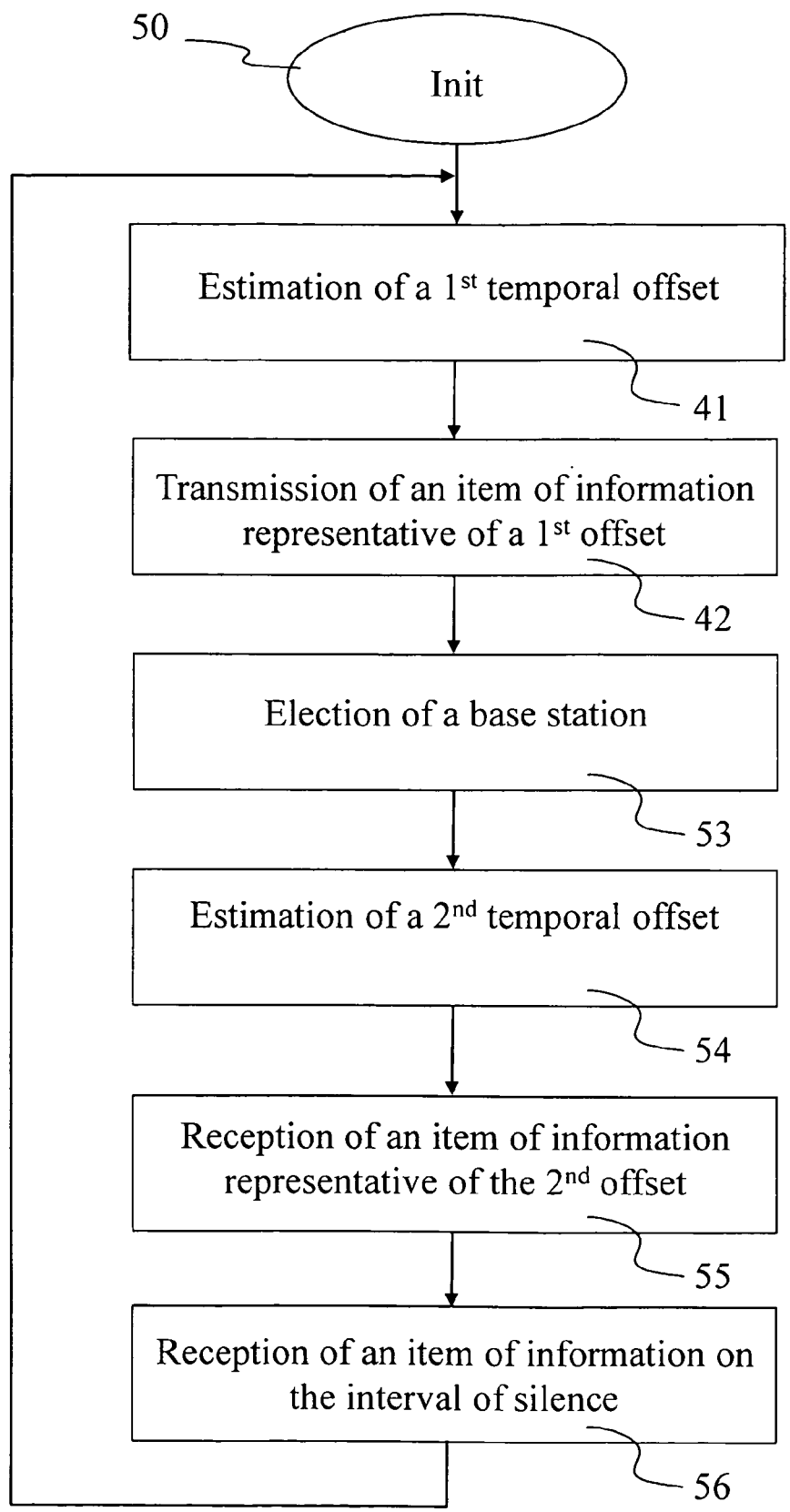
Figure 6:
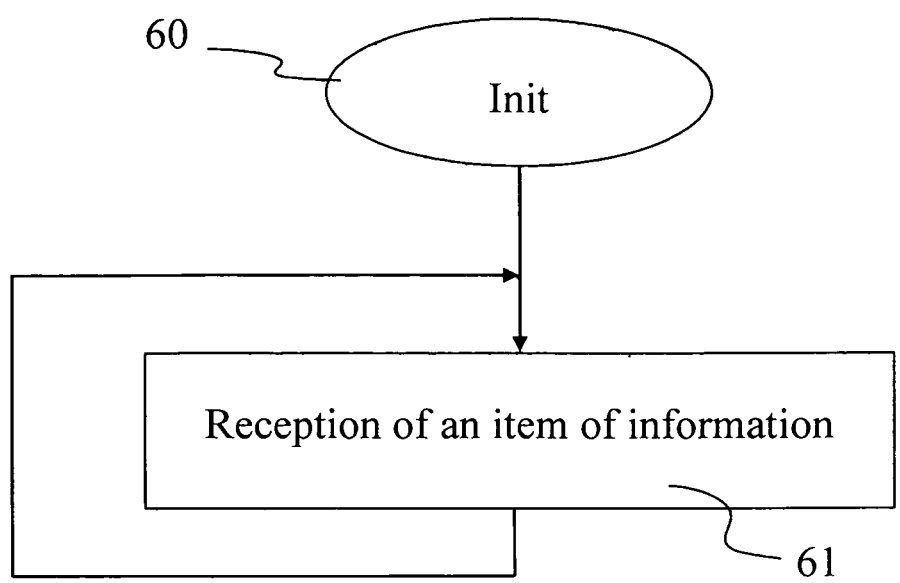
Figure 7:
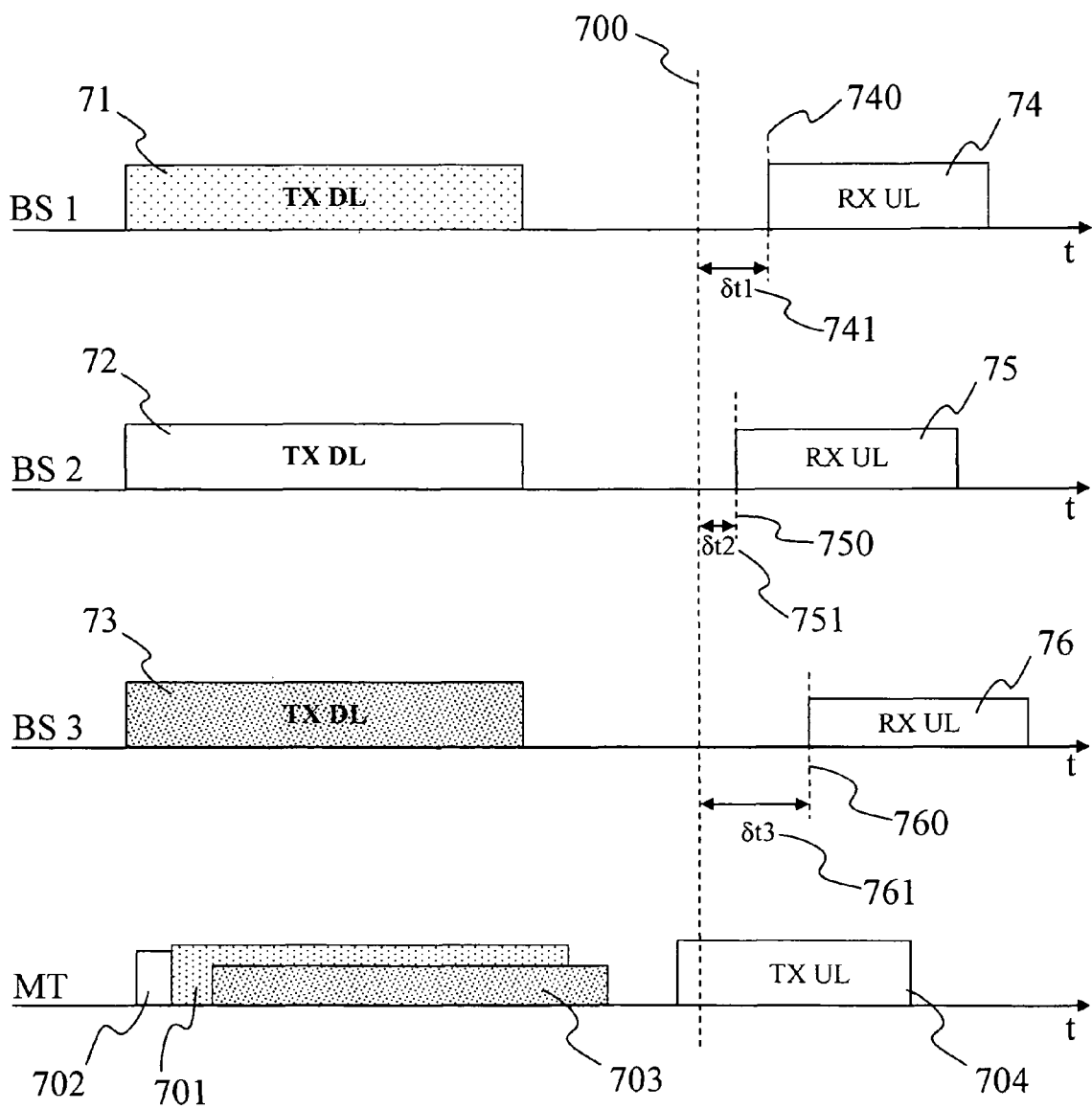
Figure 8:
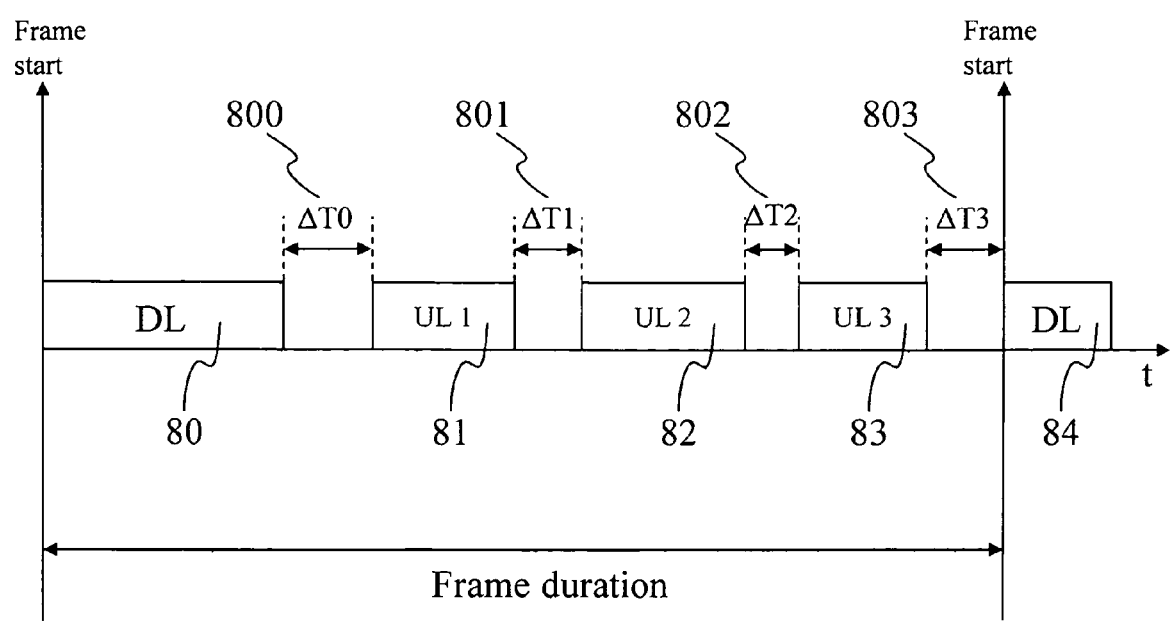

The invention will be better understood, and other specific features and advantages will emerge upon reading the following description, the description making reference to the annexed drawings wherein:

FIG. 1 shows a wireless system implementing several base stations and a mobile terminal, according to a particular embodiment of the invention, FIGS. 2 and 3 diagrammatically illustrate a respectively a base station and a mobile terminal of the system in FIG. 1, according to a particular embodiment of the invention, FIGS. 4 and 5 show a method for transmission according to particular embodiments of the invention, implemented by a least one base station of the system in FIG. 1, FIG. 6 shows a method for reception according to a particular embodiment of the invention, implemented by a mobile terminal of the system in FIG. 1, FIG. 7 shows a mode of transmission/reception of bursts according to a particular embodiment of the invention, implemented by base stations and a mobile terminal of the system in FIG. 1, and FIG. 8 shows a mode of transmission/reception of bursts according to a particular embodiment of the invention, implemented by base stations and mobile terminals of the system in FIG. 1.

DETAILED DESCRIPTION OF EMBODIMENTS OF THE INVENTION

The invention will be described in reference to a particular embodiment of a method for transmission in a wireless network comprising several base stations and at least one mobile terminal. The base stations transmit synchronously a same signal at a same frequency intended for a mobile terminal and the mobile terminal transmits a same signal intended for a plurality of base stations. The base stations having received the signal transmitted by the mobile terminal measuring the real reception time of the signal and comparing it with a reference time corresponding to the time at which the signal was expected. The network thus estimates the reception offsets of the signal with respect to the time of reception expected and calculates a temporal offset that the mobile terminal should apply for the transmission of a second signal, in order to optimise the reception of this second signal by the base stations. An item of information representative of a temporal offset is transmitted intended for a mobile terminal, the temporal offset being estimated from the reception by one or several base stations of a signal transmitted by the mobile terminal intended for the plurality of base stations.

FIG. 1 shows a wireless communication system 1 implementing several base stations 11, 12 and 13 and a mobile terminal 10, according to a particular embodiment of the invention. The base stations 11 to 13 transmit at a single frequency, that is to say that the base stations operate at a single frequency (that is to say with a negligible difference in frequency with regard to the OFDM system considered, typically less then 1 Hz for a DVB-T (Digital Video Broadcasting—Terrestrial) type system. The transmission at a single frequency by the set of base stations of the network enables dispensing with any "handover" mechanism at the level of the mobile terminal. The mobile terminal 10 transmits the same signals intended for base stations 11 to 13, that is to say that the mobile terminal uses a same physical channel to transmit the same data to the base stations 11 to 13. Generally, a physical channel is characterized by a band of frequencies and a time slot. In the particular case of a CDMA (Code Division Multiple Access) access a physical channel is also characterized by a spread code. The base stations 11 to 13 and the mobile terminal 10 each have a single transmission antenna. The mobile terminal 10 is able to receive and decode the signals transmitted by the base stations 11 to 13 and the base stations 11 to 13 are able to receive and decode the signals transmitted by the mobile terminal 10.

Advantageously, the mobile terminal 10 of system 1 is a portable device, for example a portable telephone or terminal adapted to receive and process broadcast services (for example voice or audio data restitution and/or video data display, or more generally restitution, storage or processing of multimedia data).

Advantageously, the base stations 11 to 13 of the system 1 are fixed devices. The base stations are high powered transmitters adapted to broadcast data over a wide coverage area or average or low powered transmitters adapted to broadcast data over a more restricted coverage area. According to a variant, one at least of the base stations 11 to 13 forms a system covering a "picocell" that is to say a small area, such as the interior of a building, a supermarket, a station, that is to say having a range of a few dozen metres (according to some embodiments, in a picocell, the range is advantageously less than 300 m). According to another variant, at least one of the base stations forms a system designed to cover a "femtocell" that is to say an area restricted to a smaller size than a picocell, such as a few rooms of a house or building, one floor of a building, a plane, that is to say having a range of a few metres (according to some embodiments, in a femtocell the range is advantageously less than 100 metres).

According to a variant, the base stations 11 to 13 are of SISO (Single Input Single Output) type and have only a single antenna. The base stations form a synchronized network transmitting to a given mobile terminal a same content at a same frequency, that is to say the base stations operate on a single frequency (that is to say with a negligible deviation in frequency with respect to the OFDM system considered (typically less than 1 Hz for a DVB-T type system)) in a synchronous manner (that is with a negligible temporal deviation (for example less than 1 µs) and without temporal sliding of a signal transmitted by a base station with respect to another signal transmitted by another base station), the transmission frequency being synchronized on the different base stations, for example by the reception of a reference frequency provided by an external element (for example by GPS (Global Positioning System) satellite or terrestrial broadcast station of a reference time or frequency).

According to another variant, the base stations 11 to 13 are of MIMO type and each have a MIMO coder and several antennas transmitting a MIMO signal. According to this variant, the base stations also form a synchronized network transmitting a same content intended for a given mobile terminal at a same frequency.

Advantageously some of the base stations of the system 1 are of SISO type and some are of MIMO type. According to this variant, the base stations also form a synchronized network transmitting a same content intended for a given mobile terminal at a same frequency.

According to another embodiment, the base stations 11 to 13 form a cooperative MIMO system in which the base stations possess indifferently one or several antennas. Such a cooperative MIMO system uses antennas distributed over several base stations, that is to say that the signal transmitted is distributed spatially between several antennas that can belong to several base stations of a same sub-set. The complete signal, with all the spatial streams, is combined in the air to be received by the mobile terminal to which are assigned the base stations of the considered sub-set. The base stations of such a cooperative MIMO system also form a synchronized network transmitting a same content intended for the considered mobile terminal at a same frequency.

According to another variant, some base stations of the system 1 are of MIMO type, cooperative or not, and the others are of SISO type.

Advantageously, the mobile terminal 10 is of MIMO type and possesses several antennas.

According to a variant, some base stations form a sub-set of base stations associated with the mobile terminal. Advantageously, these base stations belonging to the sub-set have a common characteristic: they are for example situated in a same geographical area or define a same sub-network or offer similar services. According to a variant, the definition of a subset by the base stations that it contains is fixed in time or varied in time.

According to another variant, the system 1 implements several mobile terminals, each mobile terminal transmitting the same signals intended for the plurality of base stations.

FIG. 2 diagrammatically shows a hardware embodiment of a base station 2 corresponding for example to the base stations 11 to 13 of FIG. 1.

The base station 2 comprises the following elements, connected to each other by a bus 24 of addresses and data that also transports a clock signal:
  a microprocessor 21 (or CPU),
  a non-volatile memory of ROM (Read Only Memory) type 22,
  a Random Access Memory or RAM 23,
  a radio interface 26,
  an interface 27 adapted for the transmission of data (for example broadcasting of services or multipoint to point or point to point transmission) and performing notably the functions of a coder and/or OFDM modulators,
  an interface 28 adapted to receive a synchronisation signal and to synchronise the interface 27, and/or
  a MMI (Man Machine Interface) interface 29 or to a specific application suitable for displaying information for a user and/or inputting data or parameters (for example the setting of parameters of sub-carriers and of data to be transmitted).

It is noted that the word "register" used in the description of memories 22 and 23 designates in each of the memories mentioned, both a memory zone of low capacity (some binary data) as well as a memory zone of large capacity (enabling a whole programme to be stored or all or part of the data representative of data received or to be broadcast).

The memory ROM 22 comprises notably:
  a "prog" 220 program, and
  parameters 221 of physical layers.

The algorithms implementing the steps of the method specific to the invention and described hereafter are stored in the memory ROM 22 associated with the base station 2 implementing these steps. When powered up, the microprocessor 21 loads and runs the instructions of these algorithms.

The random access memory 23 notably comprises:
  in a register 230, the operating programme of the microprocessor 21 responsible for switching on the base station 2,
  the transmission parameters 231 (for example parameters for modulation, encoding, MIMO, recurrence of frames),
  the reception parameters 232 (for example parameters for modulation, encoding, MIMO, recurrence of frames),
  incoming data 233,
  coded data 234 for transmission of data,
  decoded data 235 formed to be transmitted at the interface to the application 29.
  data 236 representative of reception times of signals measured by the base station, and
  data 237 representative of a first temporal offset to be applied at the transmission of signals by a mobile terminal 3 and/or a second temporal offset representative of the delay or of the advance in reception of signals by the base station 2 with respect to a reference time.

The radio interface 26 is adapted for the reception of signals broadcast if necessary by the mobile terminal 10 of the system 1.

FIG. 3 diagrammatically shows a hardware embodiment of a mobile terminal 3 belonging to the system 1, corresponding for example to the mobile terminal 10 and adapted to receive and decode the signals transmitted by the base station 2.

The mobile terminal 3 comprises the following elements, connected to each other by a bus 34 of addresses and data that also transports a clock signal:
  a microprocessor 31 (or CPU),
  a non-volatile memory of ROM (Read Only Memory) type 32,
  a Random Access Memory or RAM 33,
  a radio interface 36,
  an interface 37 adapted for the transmission of data, and
  an MMI interface 39 adapted for displaying information for a user and/or inputting data or parameters (for example the setting of parameters of sub-carriers and data transmitted).

It is noted that the word "register" used in the description of memories 32 and 33 designates in each of the memories mentioned, a memory zone of low capacity as well as a memory zone of large capacity (enabling a whole programme to be stored or all or part of the data representing data sets received or decoded).

The memory ROM 32 comprises notably:
  a "prog" 320 program, and
  parameters 321 of physical layers.

The algorithms implementing the steps of the method specific to the invention and described below are stored in the ROM 32 memory associated with the mobile terminal 3 implementing these steps. When powered up, the microprocessor 31 loads and runs the instructions of these algorithms.

The random access memory 33 notably comprises:
  in a register 330, the operating programme of the microprocessor 31 responsible for switching on the mobile terminal 3,
  the reception parameters 331 (for example parameters for modulation, encoding, MIMO, recurrence of frames),
  the transmission parameters 332 (for example parameters for modulation, encoding, MIMO, recurrence of frames),
  incoming data 333 corresponding to the data received and decoded by the receiver 36, coded data 334 for transmission of data,
decoded data 335 formed to be transmitted at the interface to the application 39, and
data 336 representative of a temporal offset to be applied at the transmission of a signal by the mobile terminal 3.

Other structures of the base station 2 and/or of the mobile terminal 3 than those described with respect to the FIGS. 2 and 3 are compatible with the invention. In particular, according to variants, base stations and/or mobile terminals compatible with the invention are implemented according to a purely hardware embodiment, for example in the form of a dedicated component (for example in an ASIC (Application Specific Integrated Circuit) or FPGA (Field-Programmable Gate Array) or VLSI (Very Large Scale Integration) or of several electronic components integrated into a device or even in a form of a combination of hardware elements and software elements.

The radio interface 36 is adapted for the reception of signals broadcast by the base stations 11 to 13 of the system 1.

FIG. 4 shows a method for transmission implemented in at least one base station of the system 1, according to a particularly advantageous non-restrictive embodiment of the invention.

During an initialisation step 40, the various parameters of the at least one base station are updated. In particular, the parameters corresponding to the signals to be transmitted or received and to the corresponding sub-carriers are initialised in any manner (for example, following the reception of initialisation messages transmitted by one of the base stations, known as a master station or by a server not represented of system 1, or by operator commands).

Then, during a step 41, a first temporal offset is estimated by a base station of the plurality of base stations or by a server of the system 1 not shown in FIG. 1 and connected to the plurality of base stations. The first temporal offset is estimated on the basis of reception times of a same first signal transmitted by the mobile terminal 10 and received by one or several base stations 11 to 13. Each base station having received the first signal measures the reception time of this first signal. Thus, and as shown in FIG. 7, bursts are exchanged between the base stations BS1, BS2 and BS3 on one side and the mobile terminal MT on the other side. The base stations BS1, BS2 and BS3 (referenced respectively 11, 12 and 13 in FIG. 1) transmit in a downlink respectively three bursts 71, 72 and 73 representative of the same items of data, in a synchronised way and at a same frequency (that is to say with a frequency deviation that is negligible with respect to the OFDM system considered, typically less than 1 Hz for a DVB-T type system). The distances separating each of the base stations 11 to 13 of the mobile terminal 10 being different, the propagation times of bursts 71 to 73 transmitted simultaneously by respectively the base stations 11 to 13 are themselves also different. Thus, the base station 12 being closest to the mobile terminal 10, the burst 72 transmitted by BS2 is received first (burst 702) by the mobile terminal 10. The burst 71 transmitted by BS1 is then received second (burst 701) then the burst 73 transmitted by the station BS3 furthest from the mobile terminal 10 is finally received (burst 703). As shown in FIG. 7, the level of reception of each of the bursts 701, 702 and 703 is different and depends for example on one or several parameters belonging to the following group:
the distance separating the base station having transmitted the burst considered from the mobile terminal receiving the burst,
the transmission power of the burst by the base station considered, and
the quality of the link between the base station having transmitted the burst and the mobile terminal receiving the burst thus transmitted, the quality of the link depending for example on the presence of obstacles (for example a tree, wall or building) on the propagation path and being for example according to a Signal to Noise Ratio (SNR), the SNR being an example of measurement representative of the quality of the link.

Once the bursts 701 to 703 have been received and decoded by the mobile terminal 10, the mobile terminal transmits a burst 704 to the base stations BS1, BS2 and BS3 after respecting a determined interval of silence.

According to a first embodiment, the burst 704 is transmitted during a time slot specified by the network of base stations, this time slot corresponding to a temporal interval during which new mobile terminals can join the network. This process is known to those skilled in the art as "initial ranging" and is described in more detail for example in the IEEE standard 802.16e-2005. During the initial ranging process, the burst 704 transmitted by the mobile terminal is expected by each of the base stations BS1 to BS3 in connection with the mobile terminal at a predetermined temporal interval and assigned by a master station or a server managing the network of base stations. The burst 704 transmitted by the mobile terminal 10 is thus expected by each of the base stations BS1 to BS3 at a reference time 700, corresponding to the start of the temporal interval assigned by the network for the reception of bursts transmitted by the new mobile terminals desiring to join the network. Each station BS1 to BS3 receiving the burst 704 transmitted thus measures respectively the real time of reception 740, 750 and 760 respectively the bursts received 74, 75 and 76. These reception times are then transmitted to a master station or a server managing the network of base stations that can deduce a "reception offset" $\delta t1$, $\delta t2$ and $\delta t3$ for each of the base stations BS1 to BS3, and corresponding to the time of reception minus the reference time. According to a variant, each base station estimates the reception offset relating to it and transmits it to a master station or a server. Using the reception offsets associated with each of the base stations thus estimated, the temporal offset that must be applied by the mobile terminal for the transmission of the following burst (or of the next signal transmitted intended for the plurality of base stations) is then estimated. This temporal offset will be named first temporal offset in the remainder of the description. Advantageously, the first temporal offset is determined in such a way that the reception of a second burst transmitted by the mobile terminal with account taken of this first temporal offset coincides for a base station with the reference time for the reception of the second burst by the base stations, the reference time corresponding to the start of the time slot assigned by the network for the reception of bursts transmitted by the mobile terminal 10. The base station for which the reception time of the second burst coincides with the reference time is advantageously the base station BS2 for which the reception offset estimated during the reception of the first burst is lowest, namely $\delta t2$ (751) in FIG. 7. Thus to coincide the reception of the second burst by BS2 with the reference time, the transmission of the second burst by the mobile terminal 10 must be advanced by $\delta t2$. This solution has the advantage of a simple and rapid estimation of the first temporal offset and that the reception offsets of the second burst by the other base stations BS1 and BS3 are always positive. According to the invention, the reception time and the reference time coincide when the temporal offset between these two times is for example less than 100 ns or 1 $\mu$s. According to a variant, the first temporal offset is determined on the basis of two reception temporal offsets corresponding to two base stations. For example, the first temporal offset is determined from reception offsets δt1 and δt2 of respectively BS1 and BS2 δt1 and δt2 having close values compared to δt3. In this case, the first temporal offset takes a value equal to for example (δt1+δt2)/2. The transmission of the second burst by the mobile terminal 10 is thus advanced by a duration equal to (δt1+δt2)/2. The advantage of such a solution is that the reception of the second burst is optimised for two base stations. According to another variant, the first temporal offset is determined on the basis of all the reception temporal offsets corresponding to the set of base stations, that is to say BS1 to BS3 according to FIG. 7. The value taken by the first temporal offset is for example equal to (δt1+δt2+δt3)/3 and the transmission of the second burst by the mobile terminal is advanced by a duration equal to (δt1+δt2+δt3)/3.

According to a second embodiment, the ranging of the transmission of a signal transmitted by the mobile terminal 10 intended for the set of base stations 11 to 13 is periodic. The first temporal offset to be applied to a signal or a burst transmitted by the mobile terminal is estimated from one or several reception temporal offsets determined by one or several base stations on the basis of the signal or burst received just before. This embodiment has the advantage to adapt the first temporal offset according to for example the displacement of the mobile terminal. The reception offset(s) δt1 to δt3 having served as a basis for the estimation from the first temporal offset are not necessarily the same for each estimation of the first temporal offset. Advantageously, a master base station or a server records in a table the reception offsets estimated for the mobile terminal 10. According to a variant, in the case where several mobile terminals each transmit a same signal intended for base stations 11 to 13, the server or master station maintains a table for each mobile terminal in which are recorded the reception offsets for each base station. The maintenance of such tables (or of such a table in the case of a single mobile terminal) enables the master station (or the server) to constantly adjust the base stations (and thus the corresponding reception offsets) serving as a basis for the calculation of the first temporal offset.

Advantageously, in addition to being according to one or several reception times of a first signal transmitted by the mobile terminal to the base stations, the first temporal offset is also according to a first parameter belonging to the following group of parameters:

power of the signal received by at least one of the base stations 11 to 13: the base station receiving the signal transmitted (or the burst 704) with the best level of power, the level of power being estimated by each of the base stations having received the signal transmitted according to any technique known to those skilled in the art, is advantageously selected so that the reception offset is used that is associated with it for the estimation of the first temporal offset. According to a variant, the two base stations having the best reception of the signal from among the plurality of base stations are selected so that the reception offsets that are associated with each of them for the estimation of the first temporal offset are used. According to another variant, the base station(s) for which the reception power level is greater than a threshold value (for example—80 dB) are selected for the estimation of the first temporal offset. The taking into account of this parameter offers notably the advantage of only using for the calculation of the first temporal offset the base station(s) receiving the signal with a level of power effectively sufficient for the processing of the signal transmitted by the mobile terminal, quality of the link between at least one of the base stations 11 to 13 and the mobile terminal 10, the quality of the link between a base station and the mobile terminal is for example estimated by determining the Signal to Noise Ratio (SNR). Advantageously, the base station having the highest SNR is selected so that the reception offset that is associated with it for the estimation of the first temporal offset is used. According to a variant, the two base stations having the highest SNRs are selected so that the reception offsets that are associated with each of them are used for the estimation of the first temporal offset. According to another variant, the base station(s) for which the SNR is greater than a threshold value (for example 10 dB, enabling notably a sufficiently precise estimation of the reception offset of a transmitted signal to be obtained, or 20 dB, enabling notably a high bitrate transmission of data) are selected for the estimation of the first temporal offset. The taking into account of this parameter offers notably the advantage of only using for the calculation of the first temporal offset the base station(s) receiving the signal sufficiently audibly to be able to process it, and available bitrate of at least one of the base stations 11 to 13: the base station or the two base stations offering the best available bitrate for the link with the mobile terminal is (are) selected so that the reception offset(s) that are associated with it (them) is (are) used for the estimation of the first temporal offset. According to another variant, the base station or base stations for which the available bitrate is greater than a threshold value (for example 90 Kb/s for voice or 2 Mb/s for video) are selected for the estimation of the first temporal offset. The taking into account of this parameter offers notably the advantage of only using for the calculation of the first temporal offset the base station(s) for which the available bitrate is sufficient to transmit the data to the mobile terminal.

According to a variant, the group of parameters only comprises a single or two or three of the parameters listed above. According to another variant, the first parameter is a combination of at least two parameters of the group of parameters defined above, for example a combination associating the link quality with the available bitrate.

Advantageously, the parameters listed above are stored in a table maintained by a master station or a server controlling the network of base stations for each mobile terminal, each of these tables containing the parameters estimated for each base station. The maintenance of such tables (or of such a table in the case of a single mobile terminal) enables the master station (or the server) to constantly adjust the base stations serving as a reference for the calculation of the first temporal offset.

Then, during a step 42, at least one base station transmits to a mobile terminal 10 an item of information representative of the first temporal offset. The first temporal offset is to be applied for the transmission via the mobile terminal of a second burst or of a second signal following that used for the estimation of reception offsets by the base stations. According to a variant, the network management server requests of the base station having served as base for the estimation of the first temporal offset, according to the one or several parameters described above, to transmit the information representative of the first temporal offset. Advantageously, the server requests of several base stations, for example two base stations, to transmit the information representative of the first temporal offset intended for the mobile terminal. In this case, the base stations transmitting the information are advantageously those for which the reception offsets of a first signal (or of a first burst) transmitted by the mobile terminal served as a base for the estimation of the first temporal offset. According to a variant, all the base stations transmit information representative of the first temporal offset in a synchronized way and at the same frequency.

FIG. 5 shows a method for transmission implemented in at least one base station of the system 1, according to a particularly advantageous non-restrictive embodiment of the invention. Some steps are similar to the steps previously described and have the same references.

During an initialisation step 50, the various parameters of the at least one base station are updated. In particular, the parameters corresponding to the signals to be transmitted or received and to the corresponding sub-carriers are initialised in any manner (for example, following the reception of initialisation messages transmitted by one of the base stations, known as a master station or by a server not represented of system 1, or by operator commands).

Then during a step 41, a first temporal offset is estimated (according to the time (or times) of reception of the first signal transmitted by the mobile terminal to the base station(s), the reception times being measured with respect to a reference time) and during a step 42, an item of information representative of the first temporal offset estimated during the step 41 is transmitted to the mobile terminal 10. These steps 41 and 42 are identical to the steps described previously and have the same references.

Then, during a step 53, a base station is elected reference base station for the mobile terminal 10. Advantageously, the reference base station is the station that decodes the signals transmitted by the mobile terminal. The other base stations of the network also receiving the signals transmitted by the mobile terminal do not decode them. This election of a reference base station offers the advantage of optimising the network resources by assigning only one base station to the decoding of the signals transmitted by the mobile terminal 10. Advantageously, the reference base station is that for which the reception of the second burst coincides with the reference time, following the temporal offset estimated during step 41. According to a variant, several base stations, for example two or three base stations, are elected reference base stations. Each of the reference base stations decodes the signals transmitted by the mobile terminal, the signals thus decoded being transmitted to a server (or a gateway) of the network or to a master station for processing. Thus, if one of the reference base stations has not correctly received a signal transmitted by the mobile terminal, or receives it in an incomplete way, the server or the master station can recompose the signal received from the signal decoded by another reference base station. This election of several base stations offers the advantage of minimising the loss of data transmitted by the mobile terminal and of minimising the signal reception errors. The election of one or several base stations is implemented by a network management server or by a master base station. The election of the reference base station(s) is carried out according to a determined criterion belonging to a group comprising:

a reception temporal offset: the base station for which the estimated reception temporal offset is lowest is elected reference base station, that is to say the base station for which the reception time of a signal transmitted by the mobile terminal is closest to the reference time of reception by the base stations of the signal transmitted by the mobile terminal. According to a variant, the base stations, for example two base stations, having the lowest reception temporal offsets are elected reference base stations. According to another variant, the base station(s) for which the reception temporal offset is less than a threshold value (for example less than 3 μs or less than 800 ns) is (are) elected reference base station(s).

power of the signal received by at least one of the base stations 11 to 13: the base station receiving the transmitted signal (or the burst 704) with the best power level, the power level being estimated by each of the base stations having received the transmitted signal according to any technique known to those skilled in the art, is advantageously elected as reference base station. According to a variant, the two base stations having the best reception of the signal from among the plurality of base stations are elected reference base stations. According to another variant, the base station(s) for which the reception power level is greater than a threshold value (for example—80 dB) is (are) elected reference base station(s). The taking into account of this criterion offers notably the advantage of electing the base station(s) receiving the signal with a power level in fact sufficient for the processing of the signal transmitted by the mobile terminal, quality of the link between at least one of the base stations 11 to 13 and the mobile terminal 10, the quality of the link between a base station and the mobile terminal is for example estimated by determining the Signal to Noise Ratio (SNR). Advantageously, the base station having the highest SNR is elected reference base station. According to a variant, the two base stations with the highest SNR are elected reference base stations. According to another variant, the base station(s) for which the SNR is greater than a threshold value (for example 10 dB or 20 dB) is (are) elected reference base station(s). The account taken of this criterion offers notably the advantage to elect the base stations receiving the signal in a manner sufficiently audible to be able to process it, and available bitrate of at least one of the base stations 11 to 13: the base station or the two base stations offering the best available bitrate for the link with the mobile terminal is (are) elected reference base station(s). According to another variant, the base station or base stations for which the available bitrate is greater than a threshold value (for example 90 Kb/s for voice or 2 Mb/s for video) is(are) selected as reference base station(s). The account taken of this criterion offers notably the advantage to elect the base station(s) for which the available bitrate is sufficient to transmit the data to the mobile terminal.

According to a variant, the group of criteria only comprises a single or two or three or four of the parameters listed above. According to another variant, the first parameter is a combination of at least two parameters of the group of parameters defined above, for example a combination associating a reception temporal offset with the available bitrate.

Then, during a step 54, a second temporal offset is estimated for at least one base station on the base of the first signal (or of a first burst) transmitted by the mobile terminal 10. The second reception offset corresponds to the difference between an expected reception time of a second signal transmitted by the mobile terminal, the transmission of this second signal by the mobile terminal having been advanced or reversed by a duration equal to the first temporal offset, and a reception reference time of the second signal by the plurality of base stations. Once the first temporal offset has been estimated, for example by a network management server or a master base station, the server or the master base station estimate for one or several base station(s) the offset, with respect to a reference time, with which the base station(s) will receive the second signal transmitted. According to a variant, the estimation of this second reception offset is carried out for the reference base station(s) of the mobile terminal. According to another variant, the estimation of the reception offset is carried out for each of the base stations of the plurality of base stations 11 to 13.

Then, during a step 55, the information representative of the second temporal offset is transmitted by the server or a master station to the base station(s) considered. The base station(s) for which the second temporal offset was calculated receives this information containing the value of the temporal offset with which will be received a second signal transmitted by the mobile terminal to that base station or those base stations. This information corresponds to an estimation of the advance on or lateness with respect to the reference reception time of the second signal with which this second signal will be received. According to a variant, the reference station(s) each receive the information representative of the second temporal offset that is associated with them. According to another variant, each base station of the plurality of base stations 11 to 13 receives the information representative of the second reception offset that is associated with it. The reception of such an item of information by a base station enables the base station considered to optimise the audibility and the reception of the second signal transmitted over a more precise time slot better corresponding to what is expected. According to a variant, the information representative of the second offset is not transmitted to the base stations.

During a step 56, at least one base station receives an item of information representative of an interval of silence corresponding to the time slot comprised between the end of the reception of a burst and start of the reception of a following burst, or the time slot comprised between the end of the transmission of a burst and the start of the reception of a following burst. An interval of silence is interposed between the transmission of a burst and the reception of a burst or between the receptions of two bursts to avoid any overlapping of burst at base station level. According to the prior art, the silence enables the constraints of the base station to be respected: notably for the RX/TX handover, the start-up of the amplifier, etc. According to the invention, the silence is increased to avoid overlapping due to the real reception times of different bursts according to the base stations.

FIG. 8 illustrates a frame representative of the transmission and the reception of bursts in a network formed by at least one base station 11, 12 or 13 and three mobile terminals each transmitting at least one burst 81, 82, 83 to a plurality of base stations. On one frame, the base stations transmitting in downlink a same burst DL referenced 80 in a synchronised way and the mobile terminals transmitting in uplink three bursts UL1, UL2, UL3 referenced 81, 82, and 83 to the base stations. A first interval of silence $\Delta T0$ 800 separates the burst DL 80 from the burst UL 81. The first interval of silence $\Delta T0$ extends from the end of the burst DL 80 to the start of the burst UL1 81. This first interval of silence enables notably the base station to pass from a transmission mode to a reception mode and enables the mobile terminal to pass from a reception mode to a transmission mode. A second interval of silence $\Delta T1$ 801 separates the burst UL 81 from the burst UL 82. The second interval of silence $\Delta T1$ extends from the end of the burst UL1 81 to the start of the burst UL2 82. A third interval of silence $\Delta T2$ 802 separates the burst UL2 82 from the burst UL3 83. The third interval of silence $\Delta T2$ extends from the end of the burst UL2 82 to the start of the burst UL3 83. The second and third intervals $\Delta T1$ and $\Delta T2$ correspond to the period necessary for a base station to pass from the reception of a burst UL1 to another consecutive burst UL2. In a way known to those skilled in the art, these interval values $\Delta T1$ and $\Delta T2$ are linked to the hardware of the base station. Finally, a fourth interval of silence $\Delta T3$ 803 separates the burst UL3 83 from the burst DL 84 forming the start of the next frame. The fourth interval of silence $\Delta T3$ extends from the end of the burst UL3 83 to the start of the burst DL 84. This fourth interval of silence enables notably a base station to pass from a reception mode to a transmission mode and enables the mobile terminal to pass from a transmission mode to a reception mode. The three bursts UL1, UL2 and UL3 received by the base station(s) were advantageously transmitted by three mobile terminals in communication with the base stations.

According to a first variant, the first interval of silence $\Delta T0$ is a function of the reception temporal offset estimated for a base station, for example a base station elected as a reference station for the mobile terminal. The reception temporal offset for this base station communicating with the mobile terminal is estimated from the real reception time of a second signal transmitted by the mobile terminal and corrected by the account taken of the first temporal offset and from a reception reference offset of the second signal, the reference time being the theoretical time at which the reception of the second signal is expected by the plurality of base stations of the network after account taken by the mobile terminal of the first temporal offset for the transmission of the second signal. The real reception time of the second signal does not correspond exactly to the reference time due for example to the mobility of the mobile terminal or a variation in the propagation conditions (for example the appearance of an obstacle). For example, when the mobile terminal approaches a base station at a distance d, the second signal is received by the base station with an advance proportional to twice the propagation time necessary to cover the distance d. To leave the base station an interval of silence sufficiently long to pass from a transmission mode to a reception mode, that is to say so that $\Delta T0$ respects the TTG ("Transmit/receive Transition Gap", notably defined in the standard IEEE 802.16e) of the base station, the interval of silence $\Delta T0$ is increased to twice the propagation time necessary to cover the distance d (this increase of the value of $\Delta T0$ corresponds to the second reception temporal offset of the second signal by the base station). For example, when the mobile terminal moves further from a base station at a distance d, the second signal is received by the base station with a delay proportional to twice the propagation time necessary to cover the distance d. To leave the base station an interval of silence sufficiently long to pass from a reception mode of a first burst UL1 to a second burst UL2, that is to say so that $\Delta T1$ respects the SSTG ("Subscriber Station Transition Gap", notably defined in the standard IEEE 802.16e) of the base station, the interval of silence $\Delta T1$ is increased to twice the propagation time necessary to cover the distance d (this increase of the value of $\Delta T1$ corresponds to the second reception temporal offset of the second signal by the base station). In the case where two base stations receiving the second signal are selected by the network to process the second signal transmitted by the mobile terminal, so that $\Delta T0$ respects the TTG or $\Delta T1$ respects the SSTG of two base stations, the interval of silence $\Delta T0$ and/or the interval of silence $\Delta T1$ is increased to the maximum of two reception temporal offsets of the second signal of each of the two base stations. The same reasoning applies for the determination of $\Delta T2$ and $\Delta T3$. The advantage offered by this first variant is that the intervals of silence are minimal and in consequence the losses of bandwidth linked to these silences and also minimal.

According to a second variant, the first temporal offset applied at the transmission of a second signal by the mobile terminal is based on the estimation of the reception offset of a first signal by the base station closest to the mobile terminal.

The same reasoning applies to each of the mobile terminals of the network, in this case to the three mobile terminals transmitting the burst UL1, UL2 and UL3 of FIG. 8. In this case, a second signal transmitted by one of the mobile terminals is received by each of the base stations either at the reference time (for the base station closest to the mobile terminal), or with a delay (for the base stations further from the mobile terminal). The second signals transmitted never being received before the reference time of base stations, it suffices to increase the intervals of silence $\Delta T1$, $\Delta T2$ and $\Delta T3$ according to the bursts UL1, UL2 and UL3 of a duration equal to the maximum reception delays of each of these bursts. The interval of silence $\Delta T0$ maintains a duration equal to TTG. The advantage offered by this variant is that the use of the bandwidth is optimal via an optimal management of silences.

According to a third variant, the duration added to each of the intervals of silence $\Delta T0$, $\Delta T1$, $\Delta T2$ and $\Delta T3$ is equal to at maximum twice the propagation time of a signal transmitted by a mobile terminal located at the limit of the coverage of a cell formed by the base stations. The advantage of this variant is the simplicity of implementation linked to a simple calculation of silences. In this variant, the intervals of silence are advantageously configured in a consistent manner once the network of base stations is established.

According to an advantageous implementation of the invention, the steps of estimation of a first temporal offset, of transmission of an item of information representative of a first temporal offset, of election of a base station, of estimation of a second temporal offset, of reception of an item of information representative of the second temporal offset and of reception of an item of information on an interval of silence are reiterated in their totality. According to a variant, only a portion of the steps enumerated above is reiterated. Advantageously, the reiteration of steps or of a portion of them is conditioned by one or several parameters belonging to the following group of parameters:

time slots: the reiteration of steps is made at regular time slots, cyclically, mobile terminal request: the reiteration of steps is made on request of a mobile terminal transmitting a request that all or some of the steps be reiterated, according to a variant, this request is made following reception of a signal transmitted by one or several base stations and for which the quality or the power of reception is not optimal, according to a variant, this request is made following a reception of a signal transmitted by one or several base stations and for which the quality or the power of reception is less than a threshold value, request of a base station: the reiteration of steps is made on request of a base station transmitting a request that all or some of the steps be reiterated, according to a variant, this request follows a reception of a signal transmitted by at least one mobile terminal and for which the quality or power of reception is not optimal, according to a variant, this request follows a reception of a signal transmitted by at least one mobile terminal and for which the power or quality of reception is less than a threshold value, according to another variant, this request follows reception of a signal transmitted by a mobile terminal and for which the quality or power of reception is greater than a threshold value, for example for a different base station than the reference base station, request a network management element: the reiteration of steps is made on request of a master station or a network management server so that all or some of the steps are reiterated, threshold value: the reiteration of steps is made when the difference between the real reception time by at least one base station of a signal transmitted by the mobile terminal and the corrected reference time of the second temporal offset (that is to say the theoretical reception time of the signal transmitted by the base stations) is greater than a determined threshold value (for example 100 ns or 1 $\mu$s), and allocation of base stations to the mobile terminal: when the allocation of base stations communicating with a mobile terminal is modified, that is to say when a new base station enters into communication with the mobile terminal or when a base station communicating with the mobile terminal no longer communicates with it, for example following the displacement of the mobile terminal, the reiteration of the steps or of a portion of them is carried out.

According to a variant, the group of parameters only comprises a single or two or three or four of the parameters listed above. According to another variant, the first parameter is a combination of at least two parameters of the group of parameters defined above.

FIG. 6 shows a method for reception implemented in a mobile terminal of the system 1, according to a particularly advantageous non-restrictive embodiment of the invention.

During an initialisation step 60, the different parameters of the mobile terminal are updated. In particular, the parameters corresponding to the signals to be transmitted or received and to the corresponding sub-carriers are initialised in any manner (for example, following the reception of initialisation messages transmitted by one of the base stations, known as a master station or by a server not represented of the system 1, or by operator commands).

Then during a step 61, the mobile terminal 10 receives from at least one of the base stations 11 to 13, an item of information representative of a first temporal offset that is a function of at least one reception time via at least one base station of a first signal (or of a first burst) transmitted by the mobile terminal. The first temporal offset is to be applied at the transmission via the mobile terminal 10 of a second signal (or of a second burst) following the first signal used for the estimation of reception offsets by the base stations. The first signal transmitted by the mobile terminal is transmitted to the set of base stations 11 to 13. One or several base stations having received this first signal measuring the real reception time of this first signal. These measurements are then transmitted to a master station or to a network management server that compares them with a reference time, which corresponds to the theoretical time at which the reception of the first signal by the base stations was expected. This comparison provides a reception offset for each of the base stations. According to a variant, the first temporal offset is estimated according to the reception offset of a base station, for example the closest to the mobile terminal or the base station transmitting a signal with the strongest transmission power. According to another variant, the first temporal offset is estimated according to reception offsets corresponding to two base stations, for example the two base stations closest to the mobile terminal or the two base stations for which the available bitrate is highest. The information representative of the first temporal offset is advantageously transmitted to the mobile station by a base station, for example the base station closest to the mobile terminal and for which the reception offset of the first signal transmitted by the mobile terminal is smallest. According to a variant, the information representative of the first temporal offset is transmitted by two base stations in a synchronised way, for example the two base stations closest to the mobile terminal. According to another variant, the information representative of the first temporal offset is transmitted by the set of base stations having received the first signal transmitted by the mobile terminal, in a synchronised manner.

Naturally, the invention is not limited to the embodiments previously described.

In particular, the invention is not limited to a system comprising three base stations and a mobile terminal but extends also to a system comprising at least two base stations and a plurality of mobile terminals.

Advantageously, the network formed by the plurality of base stations and the plurality of mobile terminals forms an SFN (Single Frequency Network) network, the base stations transmitting in a synchronised manner a same OFDM signal. In this way, a mobile terminal receives a combination of signals from several transmitters and decodes the combination thus obtained using the properties specific to OFDM for the cancellation of inter-symbol interference. The base stations thus form a synchronized network transmitting a same content at a same frequency, that is to say the transmitters operate on a single frequency (that is with a negligible deviation in frequency with respect to the OFDM system considered (typically less than 1 Hz for a DVB-T type system)) in a synchronous manner (that is with a negligible temporal deviation (for example less than 1 µs) and without temporal sliding of a signal transmitted by a transmitter with respect to another signal transmitted by another transmitter), the transmission frequency being synchronized on the different transmitters, for example by the reception of a reference frequency provided by an external element (for example by GPS (Global Positioning System) satellite or terrestrial broadcast station of a reference time or frequency). Each mobile terminal transmits the same signals to the plurality of base stations.

According to a variant, a portion of the plurality of base stations is assigned to each mobile terminal thus forming a cell comprising several base stations. The base stations thus assigned to the mobile terminal are responsible for the transmission of data intended for the mobile terminal and are also responsible for the reception and decoding of data transmitted by the mobile terminal. The assigning of base stations to the mobile terminal changes in time according to for example the displacement of the mobile terminal. According to a variant, the assignment of base stations to the mobile terminal is done according to reception offsets corresponding to each base station estimated from a first signal transmitted by the mobile terminal, for example when the mobile terminal wants to re-enter into the network. The base stations for which the reception offset of the first signal is less than a determined threshold value are advantageously assigned to the mobile terminal.

According to another variant, the method for transmission comprises a step of location of one or several mobile terminals. From the measurements of reception offsets of signals transmitted by the mobile terminal(s) carried out by the ease stations, it is possible to measure the relative distance between a mobile terminal and each base station having received the signal transmitted by the mobile terminal. If three base stations or more have received the signal transmitted by the mobile terminal and have measured the reception offset of this signal with respect to a reference time, a precise location of the mobile terminal is possible by any method known to those skilled in the art, for example by triangulation.

The invention claimed is:

1. A method for transmission in a wireless network, said network comprising a plurality of base stations and a mobile terminal, wherein, the base stations of the plurality of base stations being configured to transmit same data synchronously and at a same frequency to the mobile terminal, at least one same first signal being transmitted by the mobile terminal to the plurality of base stations using a same physical channel, the method comprising:

transmitting, by at least one first base station of the plurality of base stations, an information representative of a first temporal offset intended for the mobile terminal, said first temporal offset being a function of at least one reception time of said at least one same first signal by at least one second base station of the plurality of base stations; and receiving, by said at least one first base station, an information representative of an interval of silence, said interval of silence being a function of a maximum of at least two second temporal offsets, each of the at least two second temporal offsets being associated with a base station of the plurality of base stations, each of the at least two second temporal offsets being determined according to a reception of at least one second signal by the associated base station.

2. The method according to claim 1, wherein said first temporal offset is a function of at least two reception times of the at least one first signal by at least two base stations of the plurality of base stations.

3. The method according to claim 1, wherein said first temporal offset is a function of a difference between the at least one reception time of the at least one first signal by the at least one second base station and a reference time, said first temporal offset being applied to a transmission of said at least one second signal by said mobile terminal to the plurality of base stations.

4. The method according to claim 1, wherein an item of information representative of a temporal offset is associated with each base station of the plurality of base stations, each item of information representative of the temporal offset being determined according to the reception time of the at least one first signal by the corresponding base station and a reference time, said first temporal offset being selected as taking the smallest of values associated with the information representative of the temporal offset.

5. The method according to claim 1, wherein said first temporal offset is a function of at least one first parameter belonging to a group, the group comprising:

a power of a signal received by at least one base station of said plurality, a connection quality between the at least one base station of said plurality and the mobile terminal, and an available bitrate of the at least one base station of said plurality.

6. The method according to claim 1, wherein the method further comprises election of at least one reference base station for said mobile terminal among the plurality of base stations according to at least one determined criterion belonging to a group, the group comprising:

a temporal offset, a power of a signal received by at least one base station of said plurality, a connection quality between the at least one base station of said plurality and the mobile terminal, and an available bitrate of the at least one base station of said plurality.

7. The method according to claim 1 further comprising receiving, by said at least one first base station, an information representative of the at least one second temporal.

8. The method according to claim 1, wherein the method is reiterated according to at least one second parameter.

9. A base station in a wireless network comprising a plurality of base stations and a mobile terminal, wherein, the base stations of the plurality of base stations being configured to transmit same data synchronously and at a same frequency to the mobile terminal, at least one same first signal being transmitted by the mobile terminal to the plurality of base stations using a same physical channel, said base station comprising:
- a receiver configured to receive said at least one same first signal;
- a processor configured to compute a first temporal offset as a function of a reception time of said at least one same first signal; a transmitter configured to transmit an information representative of said first temporal offset intended for the mobile terminal; and
- a receiver configured to receive an information representative of an interval of silence, said interval of silence being a function of a maximum of at least two second temporal offsets, each of the at least two second temporal offsets being associated with a base station of the plurality of base stations, each of the at least two second temporal offsets being determined according to a reception of at least one second signal by the associated base station.

10. The base station according to claim 9, wherein said first temporal offset is a function of a difference between the reception time of the at least one same first signal and a reference time.

11. The base station according to claim 9, wherein said first temporal offset is a function of at least one first parameter belonging to a group, the group comprising:
- a power of a signal received by said base station,
- a connection quality between said base station and the mobile terminal, and
- an available bitrate of said base station.

* * * * *